Patented Feb. 27, 1923.

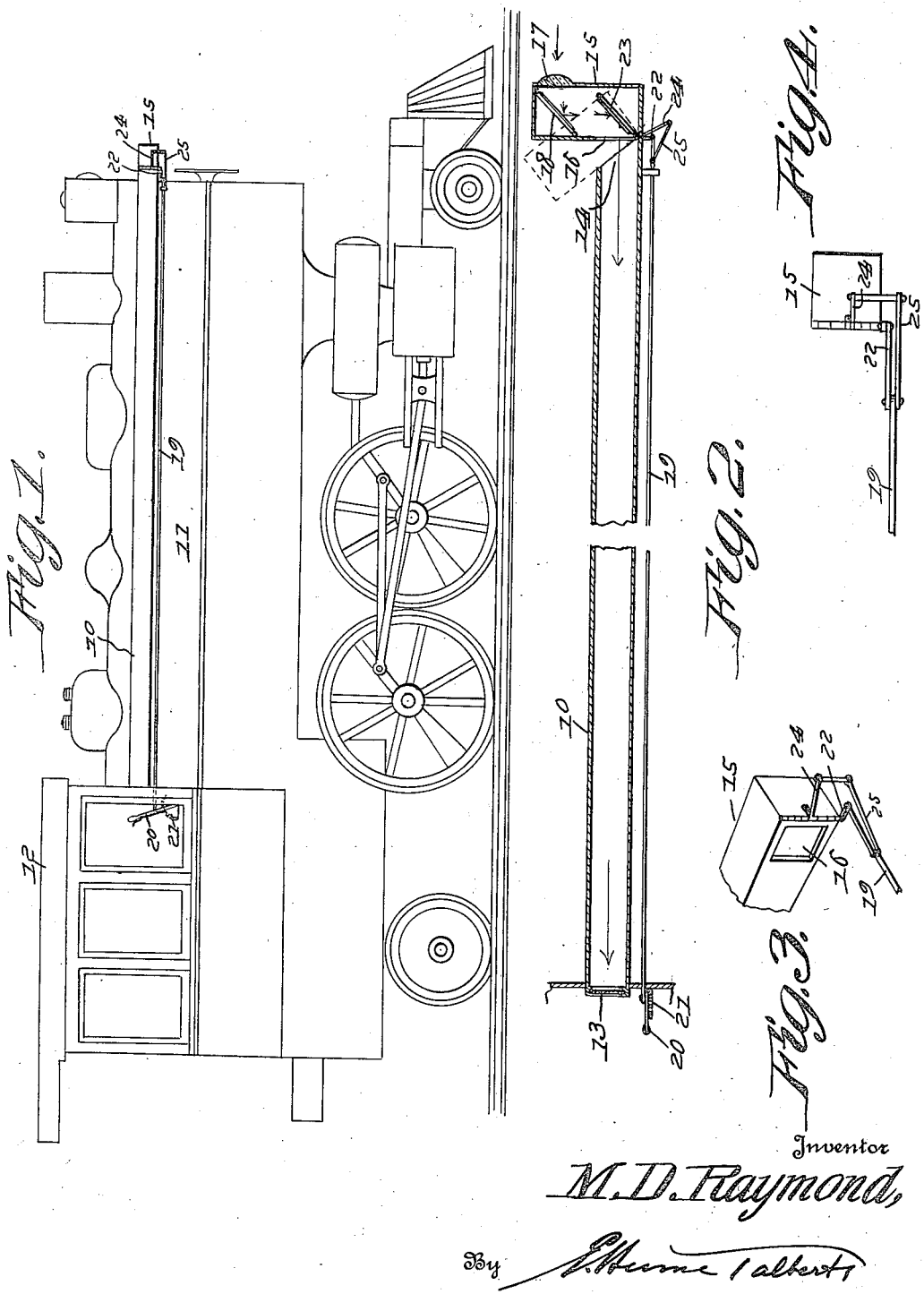

1,447,036

UNITED STATES PATENT OFFICE.

MILTON D. RAYMOND, OF MOUNT JEWETT, PENNSYLVANIA.

RAILROAD PERISCOPE.

Application filed April 22, 1921. Serial No. 463,543.

*To all whom it may concern:*

Be it known that I, MILTON D. RAYMOND, a citizen of the United States of America, residing at Mount Jewett, in the county of McKean and State of Pennsylvania, have invented new and useful Improvements in Railroad Periscopes, of which the following is a specification.

The object of the invention is to provide means for facilitating the observation of a locomotive engineer particularly in discerning signals and noting the condition of or the presence of obstructions or obstacles on curves and more especially those portions of the track which curve away from that side of the engine or locomotive which is usually occupied by the engineer and which in the majority of cases, or on most of the roads in this country is at the right side of the engine, and to whom under ordinary circumstances a view of a left-hand curve or a curve toward the left is obstructed by the portion of the locomotive in advance of the cab; and with this object in view the invention consists in a construction and combination of parts of which a preferred embodiment is shown in the accompanying drawing, wherein:—

Figure 1 is a side view of an apparatus embodying the invention in the operative position to a locomotive engine.

Figure 2 is a horizontal longitudinal sectional view of the invention.

Figure 3 is a perspective detail view showing the casing and the operative connections between it and the operating member and the reflecting mirrors and operating member.

Figure 4 is an end elevational view of the structure of Figure 3.

The apparatus consists essentially of a sight tube 10 extended longitudinally of and preferably at one side of the locomotive boiler 11, the rear end of the tube entering the cab 12 and being provided with a sight glass 13. At the forward end, the tube is cut diagonally or deflected as shown at 14 and has pivotally connected with the extremity of the bevel portion a substantially rectangular casing 15 provided with an opening 16 through which communication between the interior of the casing 15 and the forward end of the tube 10 is effected. In the front face of the casing and adjacent the end remote from the opening 16, there is provided an object lens 17 directly back of which and disposed at an angle of substantially forty-five degrees with respect to the object lens is a reflecting mirror 18, the reflecting rays of which will be at right angles to the incident rays received through the object lens and hence will be in the direction of the length of and in alignment with the axis of the casing 15.

The casing is mounted for swinging movement to provide observations being made preferably to the off side of the engineer and in order that the desired angular movement may be imparted to the casing there is provided an operating rod 19 entering the cab's rear end and pivotally connecting with the hand lever 20 engageable with a segment 21 by means of a suitable latch. The casing 15 is provided with an arm 22 which is pivotally connected with the rod 19 at the forward end of the latter.

Mounted within the casing and adjacent the opening 14 there is a mirror 23 mounted for angular movement on a pivot point in common with that of the casing 15 and provided with an operating arm 24 which is operatively connected with the rod 19 through the medium of a link 25. Since a beam of light reflected by a rotating mirror is deflected through an angle twice that of the rotation of the mirror, it follows that in order to have the reflected rays from the mirror 23 projected centrally through the tube 10, the mirror 23 must move through half the angular distance of the casing and hence the arm 24 is approximately twice the length of the arm 22 connected with the casing. Whatever the position of the casing with respect to the tube 10, the reflected rays of the mirror 18 are in a direction of the longitudinal axis of the casing and only when the casing is at right angles to the tube 10 can the mirror 23 be at an angle of forty-five degrees with respect to the axis of the tube and the axis of the casing. Movement of the casing for the operation of the rod 19 will result in half the angular movement being imparted to the mirror 23 and will thus position the latter to always project the reflected rays in the direction of the length of the tube.

Under ordinary circumstances as in traversing a straight track or a curve toward the right or that side of the engine at which the engineer's station is located, it is obvious that the use of the apparatus may not be required although its convenience even under these circumstances may be realized, but upon approaching a curve in the opposite direction or toward the left or away from the side of the engine at which the engineer's station is located, the device as described will give the engineer an unobstructed view of the track for a considerable and obviously safe distance in advance of the train, not only to facilitate the observations of block signals which may be set on the curved portion of the track but of any obstructions on the track such as the presence of a stalled or checked train bound in the same direction or entering from a siding, to the end that the necessary precautions may be taken to avoid a collision.

Having described the invention, what is claimed as new and useful is:—

1. A periscope attachment for locomotive engines consisting of a sight tube having a casing pivotally connected to the forward end of the same, said casing being provided with a sight lens axially offset from the tube, means for operating the casing to move it angularly with respect to the sight tube, and a pair of reflecting mirrors in the casing disposed in operative relation with one another, one of said mirrors being angularly movable, and means for moving said last named mirror to project the reflected rays from the other mirror in the direction of the length of the tube irrespective of the position of the casing.

2. A periscope attachment for locomotive engines consisting of a sight tube, a casing pivotally connected to the sight tube at the forward end of the latter, said casing being provided with a sight lens axially offset from the tube, cooperating reflecting mirrors mounted in the casing, an operating member and operative connections between said member and the casing and the member and the mirrors for imparting angular movement to the casing and simultaneously disposing the mirrors in proper reflecting relation in reference to said lens and said tube.

3. A periscope attachment for the purpose indicated consisting of a sight tube and associated pivotally mounted casing provided with a sight lens axially offset from the tube, cooperating reflecting mirrors mounted in the casing and operatively disposed respectively with the tube and lens, and a common means for pivotally moving said casing and simultaneously disposing said mirrors in proper relation with respect to said lens and tube.

In testimony whereof he affixes his signature.

MILTON D. RAYMOND.